(12) United States Patent
Delleree et al.

(10) Patent No.: US 11,261,770 B1
(45) Date of Patent: Mar. 1, 2022

(54) CATALYST LIGHT OFF USING PURGE FUEL AND E-BOOSTER

(71) Applicants: Matthew M Delleree, Brighton, MI (US); James Daley, Jackson, MI (US); Roger C Sager, Munith, MI (US); Joseph Dekar, Manchester, MI (US); Nithin Baradwaj, Ann Arbor, MI (US)

(72) Inventors: Matthew M Delleree, Brighton, MI (US); James Daley, Jackson, MI (US); Roger C Sager, Munith, MI (US); Joseph Dekar, Manchester, MI (US); Nithin Baradwaj, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/181,290

(22) Filed: Feb. 22, 2021

(51) Int. Cl.
| | |
|---|---|
| *F01N 3/20* | (2006.01) |
| *F01N 3/36* | (2006.01) |
| *F02B 33/40* | (2006.01) |
| *F02M 25/08* | (2006.01) |
| *F01N 3/30* | (2006.01) |

(52) U.S. Cl.
CPC ............ *F01N 3/2013* (2013.01); *F01N 3/36* (2013.01); *F02B 33/40* (2013.01); *F02M 25/08* (2013.01); *F01N 3/2033* (2013.01); *F01N 3/30* (2013.01)

(58) Field of Classification Search
CPC ........ F01N 3/2013; F01N 3/36; F01N 3/2033; F01N 3/30; F02B 33/40; F02M 25/08
See application file for complete search history.

(56) References Cited

U.S. PATENT DOCUMENTS

| | | | |
|---|---|---|---|
| 6,463,889 B2 | 10/2002 | Reddy | |
| 6,910,467 B2 | 6/2005 | Murakami et al. | |
| 7,284,541 B1 | 10/2007 | Uchida | |
| 7,575,410 B2* | 8/2009 | Uchida | .................. F01N 3/225 415/36 |
| 8,271,183 B2 | 9/2012 | Uhrich et al. | |
| 8,583,351 B2 | 11/2013 | Uhrich et al. | |

* cited by examiner

*Primary Examiner* — Brandon D Lee
(74) *Attorney, Agent, or Firm* — Ralph E. Smith

(57) ABSTRACT

A vehicle engine system includes an internal combustion engine, an air induction system configured to supply intake air to the internal combustion engine, and an evaporative emissions control (EVAP) system is configured to selectively supply purge fuel vapor to the EHC for subsequent combustion and rapid heating to a predetermined catalyst light-off temperature. The system additionally includes a booster configured to charge the intake air, and an engine bypass conduit fluidly coupled between the booster and the exhaust aftertreatment system. When the internal combustion engine is off, the booster selectively supplies a flow of intake air through the engine bypass conduit to the exhaust aftertreatment system. The flow of intake air draws purge fuel vapor from the EVAP system into the exhaust aftertreatment system.

15 Claims, 1 Drawing Sheet

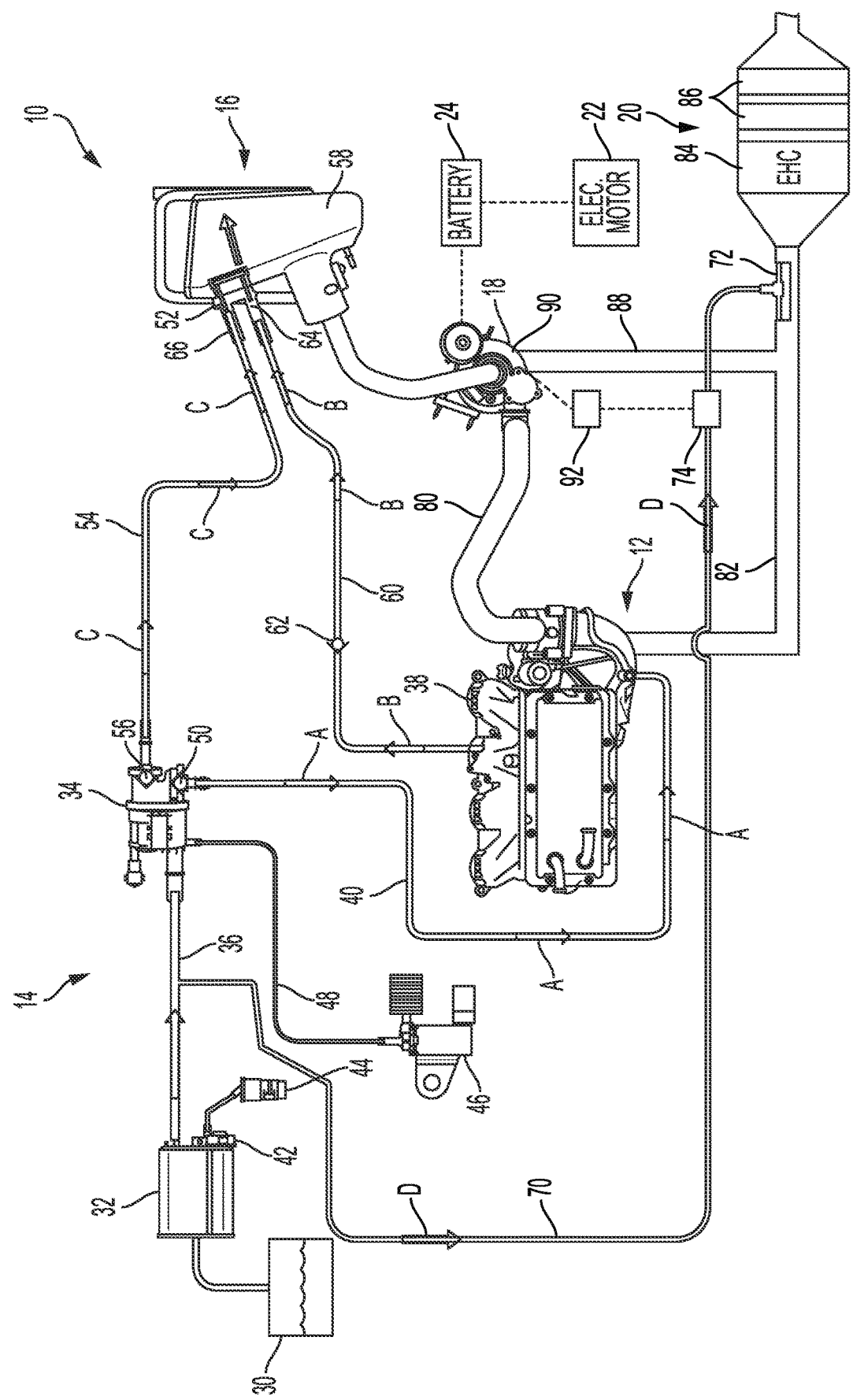

US 11,261,770 B1

CATALYST LIGHT OFF USING PURGE FUEL AND E-BOOSTER

FIELD

The present application relates generally to exhaust aftertreatment systems for vehicles and, more particularly, to catalyst light off systems using purge fuel and an e-booster.

BACKGROUND

In conventional internal combustion aftertreatment systems, it is difficult to achieve low tailpipe emissions in the time immediately following a cold engine start due to low catalyst conversion efficiency of cold catalysts. In order to achieve acceptable conversion efficiency, the catalyst must surpass a predetermined light-off temperature. In some systems, faster light-off temperatures may be achieved, but often at the cost of high exhaust system backpressure, durability, longevity, cost, and/or complexity. Thus, while such conventional systems work well for their intended purpose, it is desirable to provide continuous improvement in the relevant art.

SUMMARY

According to one example aspect of the invention, an engine system for a vehicle is provided. In the example embodiment, the engine system includes an internal combustion engine, an air induction system configured to supply intake air to the internal combustion engine, and an evaporative emissions control (EVAP) system is configured to selectively supply purge fuel vapor to the EHC for subsequent combustion and rapid heating to a predetermined catalyst light-off temperature.

In addition to the foregoing, the described engine system may include one or more of the following features: a booster configured to charge the intake air and an engine bypass conduit fluidly coupled between the booster and the exhaust aftertreatment system, wherein when the internal combustion engine is off, the booster selectively supplies a flow of intake air through the engine bypass conduit to the exhaust aftertreatment system, and wherein the flow of intake air draws purge fuel vapor from the EVAP system into the exhaust aftertreatment system; wherein the booster is an electric booster; wherein the engine bypass conduit includes a bypass valve configured to selectively allow intake air flow through the engine bypass conduit; wherein the EVAP system includes a vapor conduit fluidly coupled to the exhaust aftertreatment system; wherein the vapor conduit is fluidly coupled to the exhaust aftertreatment system at a first location downstream of a second location where the engine bypass conduit is fluidly coupled to the exhaust aftertreatment system; and wherein the EVAP system further includes an ejector tee coupled to the exhaust aftertreatment system and configured as a venturi.

In addition to the foregoing, the described engine system may include one or more of the following features: wherein intake air flow through the engine bypass conduit and past the ejector tee generates a vacuum that draws purge fuel vapor through the vapor conduit and into the exhaust aftertreatment system; wherein the EVAP system further includes a flow control valve configured to control the flow of purge fuel vapor to the EHC; wherein the EVAP system further includes a carbon canister configured to receive and store purge fuel vapor; wherein the EVAP system further includes a purge valve fluidly coupled to the carbon canister; an electric motor powered by at least one battery; wherein the booster is selectively powered by the at least one battery; wherein the exhaust aftertreatment system further includes a catalytic converter; and wherein the catalytic converter is positioned downstream of the EHC such that combustion of the purge fuel vapor is configured to rapidly heat the catalytic converter to its predetermined catalyst light-off temperature.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a schematic diagram of an example engine system in accordance with the principles of the present disclosure.

DETAILED DESCRIPTION

Described herein are systems and methods for quick catalyst light-off using purge fuel vapor and an electric booster or "e-booster" (e.g., electric turbocharger, supercharger, etc.). The system utilizes gasoline vapor from the fuel tank or a storage device, and subsequently supplies the fuel vapor to an electrically heated catalyst (EHC). In some examples, the EHC is turned on and the e-booster is actuated before engine start. The fuel vapor is combusted at the EHC, thereby rapidly increasing the catalyst temperature and achieving light-off temperatures in a very short period time, potentially before the engine is even started.

Some conventional aftertreatment systems have limited or no capacity to quickly reach catalyst light-off temperature for efficient conversion of harmful exhaust constituents post cold start in a turbocharged system. Every second the engine is running and the catalyst is not at or above light-off temperature, CO HC, and NOx are not being converted efficiently. The short time preceding the catalyst light-off is responsible for a very large portion of the CO, HC, and NOx breakthrough. By quickly reaching light-off temperatures faster than conventional systems, the systems described herein are capable significantly reducing or even preventing such breakthrough.

Referring now to the drawings, FIG. 1 illustrates an engine system 10 that generally includes an internal combustion engine 12 operably associated with an evaporative emissions control (EVAP) system 14, a forced air induction system 16, an electric booster (e-booster) 18, and an exhaust aftertreatment system 20. In the example embodiment, engine system 10 is a hybrid electric system and includes one or more electric motors 22 powered by one or more batteries 24. However, it will be appreciated that the features described herein are not limited to hybrid vehicles and may be utilized in various other types of vehicles and systems. The e-booster 18, which may be a turbocharger, supercharger, etc. may also be electrically powered by the batteries 24. As described herein in more detail, during a cold start or prior thereto, the electric booster 18 is powered by batteries 24 and utilized to supply fuel vapor from the EVAP system 14 to the exhaust aftertreatment system 20. The fuel vapor is then combusted, which facilitates reaching catalyst light-off temperature earlier than conventional systems to thereby facilitate reducing cold start hydrocarbon emissions.

With continued reference to FIG. 1, the EVAP system 14 will be described in more detail. Modern internal combustion engines generate hydrocarbon emissions by evaporation of combustible fuels such as gasoline. As a result, vehicle fuel vapor emissions to the atmosphere are regulated. For the purpose of preventing fuel vapor from escaping to the atmosphere, an evaporative emissions control (EVAP) system is typically implemented to store and subsequently dispose of fuel vapor emissions.

The EVAP system is typically designed to collect vapors produced inside an engine's fuel system and then send the vapors through the engine intake manifold into its combustion chamber to be burned as part of the aggregate fuel-air charge. When pressure builds inside the fuel tank as a result of evaporation, fuel vapors are transferred to and stored in a carbon canister. Subsequently, when engine operating conditions are conducive, a valve is opened and vacuum from the intake manifold draws a purge flow of the stored hydrocarbons from the canister to the engine's combustion chamber. Thereafter, the carbon canister is regenerated with newly formed fuel vapor, and the cycle can continue.

In the example embodiment, EVAP system 14 generally includes a fuel tank 30 in fluid communication with a purge or carbon canister 32 for capturing fuel vapor from the fuel tank 30. Carbon canister 32 is in fluid communication with a purge valve 34 via a conduit 36. Purge valve 34 is configured to selectively release the fuel vapor from carbon canister 32 to an engine intake manifold 38 via a conduit 40 in response to engine manifold vacuum.

In the example embodiment, carbon canister 32 is in fluid communication with an evaporative system integrity monitor (ESIM) switch 42, which is configured to stay on if the EVAP system 14 is operatively sealed in the presence of engine vacuum, and to toggle off if the EVAP system 14 experiences a leak (loss of vacuum). ESIM switch 42 can be in fluid communication with the atmosphere via a filter 44. Moreover, EVAP system 14 may include an on-board diagnostics vacuum bypass valve 46 in fluid communication with purge valve 34 via a conduit 48. Vacuum bypass valve 46 is a normally closed valve configured to provide open venting to the atmosphere when energized upon command. Such venting may be utilized to meet ESIM switch rational and purge monitor diagnostics and on-board diagnostics (OBD) including leak detection requirements.

A check valve 50 is disposed in conduit 40 or purge valve 34 and is configured to allow purge flow to intake manifold 38 when system pressure is less than atmospheric pressure (e.g., vacuum). Check valve 50 is configured to prevent a reversal of flow to purge valve 34 when the system pressure is greater than atmospheric pressure (e.g., boost).

Purge valve 34 is also in fluid communication with a purge ejector tee 52 via a conduit 54. A check valve 56 is disposed in conduit 54 or purge valve 34 and is configured to allow flow to the ejector tee 52 when the system pressure is greater than atmospheric pressure (e.g., boost). Check valve 56 is configured to prevent flow from purge valve 34 when the system pressure is less than atmospheric pressure (e.g., vacuum).

Ejector tee 52 is coupled to an air box 58 of the air induction system 14. Ejector tee 52 includes a nozzle or orifice (not shown) that creates a drop in pressure to form an accelerated airflow. Ejector tee 52 is also in fluid communication with the intake manifold 38 via a conduit 60. A check valve 62 is disposed in conduit 60 and is configured to allow flow to the ejector tee 52 when system pressure is greater than atmospheric pressure. Check valve 62 is configured to prevent flow from intake manifold 38 when the system pressure is less than atmospheric pressure.

In a naturally aspirated mode, the purge valve 34 can be controlled to allow flow therethrough, and fuel vapor drawn from carbon canister 32 is directed to intake manifold 38 in a flow path depicted by arrows CA. The fuel vapor is drawn from carbon canister 32 by intake manifold vacuum and the drawn fuel vapor is supplied via the intake manifold 38 to combustion chambers (not shown) of the engine 12 to be burned with the main fuel-air charge.

In a boost mode, facilitated by a e-booster 18, high pressure boost air flow from e-booster 18 flows through air conduit 60 in the direction of arrows 'B' and into a first inlet port 64 of purge ejector tee 52. From the first inlet port 64, the high pressure boost air flows through the venturi nozzle (not shown), which creates a low pressure or vacuum thereby drawing purge flow through a second inlet port 66 and into the air induction system 14. In particular, the vacuum created from the boost air flow through the venturi draws purge fuel vapor along the flow path of arrows 'C' through purge valve 34, through conduit 54, and directly into second inlet port 66. From the second inlet port 66, the purge fuel vapor flows downstream of the venturi where it mixes with the boost air flows into first inlet port 64 to be burned with the main fuel-air charge.

Additionally, in the example embodiment, a conduit 70 is coupled between conduit 36 and the exhaust aftertreatment system 20 via an ejector tee 72, which functions as a venturi to create a pressure drop and generate an accelerated flow. A flow control valve 74 (e.g., solenoid valve) is disposed in conduit 70 and is configured to control the flow concentration of fuel vapor to the exhaust aftertreatment system 20. In a light-off assist mode, the flow control valve 74 is opened and air/exhaust flowing through the exhaust aftertreatment system 20 creates a low pressure or vacuum at the ejector tee 72. This vacuum draws purge fuel vapor through conduit 70 along the flow path of arrows 'D' and into the exhaust aftertreatment system 20. The purge fuel vapor is then combusted to increase temperature and facilitate reaching catalyst light-off temperatures, as described herein.

With continued reference to FIG. 1, in the example embodiment, e-booster 18 is fluidly coupled to the intake manifold 38 via an intake conduit 80. Intake air passing through the forced air induction system 16 is compressed in the e-booster 18, directed to the intake manifold 38 via intake conduit 80, and subsequently combusted in the internal combustion engine 12. The resulting exhaust gas is then directed to a main exhaust conduit 82, which includes an electrically heated catalyst (EHC) 84 and one or more catalytic converters 86 to reduce or convert a desired exhaust gas constituent such as, for example, carbon monoxide (CO), hydrocarbon (HC), and/or nitrogen oxides (NOx). In one example, the catalytic converter 86 is a three-way catalyst configured to remove CO, HC, and NOx from the exhaust gas passing therethrough.

However, it will be appreciated that catalysts 84, 86 may be any suitable catalyst that enables exhaust aftertreatment system 20 to remove any desired pollutant or compound such as, for example, a hydrocarbon trap or a four-way catalyst. Additionally, in some examples, EHC 84 may merely be an electric heater (no catalyst) disposed within the main exhaust conduit 82 configured to heat downstream catalysts and combust fuel vapor.

In order to efficiently reduce or convert CO, HC, and NOx, the catalytic converters 86 must reach a predetermined light-off temperature. However, during some vehicle operations such as, for example, cold starts, long idle, and cold catalyst conditions, the catalytic converters 86 are below light-off temperature and therefore have a low catalyst conversion efficiency.

In order to advantageously achieve quicker catalyst light-off times than conventional systems, the described system includes an engine bypass conduit 88 fluidly coupled between the e-booster 18 and the main exhaust conduit 82. In some implementations, a bypass valve 90 is selectively movable between an open position that allows flow through bypass conduit 88, and a closed position that prevents flow through bypass conduit 88.

A controller 92 (e.g., engine control unit) is in signal communication with bypass valve 90 as well as the flow control valve 74 and is configured to move valves 74, 90 to any position between their respective fully open and fully closed positions to control flow through vapor conduit 70 and bypass conduit 88. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In this way, when desired, controller 92 is configured to direct intake air through bypass conduit 88 to the main exhaust conduit 82 at a location upstream of the ejector tee 72. This bypass flow of charged intake air creates a pressure drop at the ejector tee 72, which draws purge fuel vapor through conduit 70 when controller 92 commands flow control valve 74 to at least a partially open position. The purge fuel vapor then passes though main exhaust conduit 82 to the EHC 84, which due to the high temperatures generated thereby, causes subsequent combustion of the purge fuel vapor. The combustion advantageously results in increased temperatures, thus providing additional heating to the catalytic converters 84, 86 for faster catalyst light-off times.

In one example operation in the light-off assist mode, the engine system 10 begins in an off condition. When the controller 92 determines the engine system 10 is turned on (e.g., ignition requested, pressing 'START' button, propulsion system active, etc.) or is intended to be turned on, the controller 92 turns on the EHC 84 to begin heating the catalysts 86. The controller 92 may determine the engine system 10 is intended to be turned on, for example, via key fob proximity to the vehicle, the door handle opened, the driver detected in the driver seat, brake pedal depressed, etc., or any other suitable way that enables system 10 to function as described herein.

The controller 92 then operates e-booster 18 and opens bypass valve 90 and flow control valve 74. Accordingly, the e-booster 18 spools and pumps intake air through the bypass conduit 88 to the EHC 84. This airflow is heated by the EHC 84 and subsequently flows downstream to the catalysts 86 for heating thereof. In addition to the heat generated by EHC 84, with flow control valve 74 open, purge fuel vapor is drawn through the vapor conduit 70 and ejector tee 72. The intake air bypass flow directs the purge fuel vapor to the EHC 84, which due to its high temperature, combusts the purge fuel vapor. This creates a flame front across EHC 84 and/or catalysts 86, thereby rapidly heating to the predetermined catalyst light-off temperatures. Once controller 92 determines the EHC 84 and/or catalysts 86 have reached their respective light-off temperatures, controller 92 closes flow control valve 74 and bypass valve 90.

Described herein are systems and methods for quickly achieving catalyst light-off temperatures in an exhaust aftertreatment system having an EHC. The system includes an EVAP system configured to selectively provide purge fuel vapor to the EHC via a bypass flow of intake air directly from an e-booster to the EHC. The purge fuel vapor is combusted at the EHC to increase the temperature in the exhaust aftertreatment system to thereby rapidly warm the catalysts.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. An engine system for a vehicle, comprising:
    an internal combustion engine;
    an air induction system configured to supply intake air to the internal combustion engine;
    an exhaust aftertreatment system configured to receive exhaust gas from the internal combustion engine and including an electrically heated catalyst (EHC); and
    an evaporative emissions control (EVAP) system configured to selectively supply purge fuel vapor to the EHC for subsequent combustion and rapid heating of the EHC to a predetermined catalyst light-off temperature.

2. The engine system of claim 1, further comprising:
    a booster configured to charge the intake air; and
    an engine bypass conduit fluidly coupled between the booster and the exhaust aftertreatment system,
    wherein when the internal combustion engine is off, the booster selectively supplies a flow of intake air through the engine bypass conduit to the exhaust aftertreatment system, and
    wherein the flow of intake air draws purge fuel vapor from the EVAP system into the exhaust aftertreatment system.

3. The engine system of claim 2, wherein the booster is an electric booster.

4. The engine system of claim 2, wherein the engine bypass conduit includes a bypass valve configured to selectively allow intake air flow through the engine bypass conduit.

5. The engine system of claim 2, wherein the EVAP system includes a vapor conduit fluidly coupled to the exhaust aftertreatment system.

6. The engine system of claim 5, wherein the vapor conduit is fluidly coupled to the exhaust aftertreatment system at a first location downstream of a second location where the engine bypass conduit is fluidly coupled to the exhaust aftertreatment system.

7. The engine system of claim 5, wherein the EVAP system further includes an ejector tee coupled to the exhaust aftertreatment system and configured as a venturi.

8. The engine system of claim 7, wherein intake air flow through the engine bypass conduit and past the ejector tee generates a vacuum that draws purge fuel vapor through the vapor conduit and into the exhaust aftertreatment system.

9. The engine system of claim 5, wherein the EVAP system further includes a flow control valve configured to control the flow of purge fuel vapor to the EHC.

10. The engine system of claim 5, wherein the EVAP system further includes a carbon canister configured to receive and store purge fuel vapor.

11. The engine system of claim 10, wherein the EVAP system further includes a purge valve fluidly coupled to the carbon canister.

12. The engine system of claim 2, further comprising an electric motor powered by at least one battery.

13. The engine system of claim 12, wherein the booster is selectively powered by the at least one battery.

14. The engine system of claim 1, wherein the exhaust aftertreatment system further includes a catalytic converter.

15. The engine system of claim 14, wherein the catalytic converter is positioned downstream of the EHC such that combustion of the purge fuel vapor is configured to rapidly heat the catalytic converter to its predetermined catalyst light-off temperature.

* * * * *